United States Patent [19]
Rokutan

[11] Patent Number: 5,274,615
[45] Date of Patent: Dec. 28, 1993

[54] METHOD OF ACCESSING A CARD SHAPED RECORDING MEDIUM

[75] Inventor: Takao Rokutan, Higashimurayama, Japan

[73] Assignee: Olympus Optical Co., Ltd., Tokyo, Japan

[21] Appl. No.: 927,194

[22] Filed: Aug. 7, 1992

Related U.S. Application Data

[63] Continuation of Ser. No. 663,412, Mar. 1, 1991.

[51] Int. Cl.$^5$ ............................................. G11B 7/00
[52] U.S. Cl. ........................................ 369/32; 369/58; 369/44.32; 235/454
[58] Field of Search ............ 369/32, 58, 44.32, 44.11, 369/116, 98, 275.1, 275.2, 275.3, 275.4, 275.5; 235/454, 458, 461, 474, 470

[56] References Cited

U.S. PATENT DOCUMENTS

| | | | |
|---|---|---|---|
| 4,982,391 | 1/1991 | Sakagami et al. | 369/58 |
| 5,018,124 | 5/1991 | Ogasawara et al. | 369/58 |
| 5,027,338 | 6/1991 | Ata | 369/44.32 |
| 5,042,019 | 8/1991 | Kitai et al. | 369/32 |

FOREIGN PATENT DOCUMENTS

58-189840 11/1983 Japan.
63-37876 2/1988 Japan.

*Primary Examiner*—Aristotelis Psitos
*Assistant Examiner*—Muhammad N. Edun
*Attorney, Agent, or Firm*—Frishauf, Holtz, Goodman & Woodward

[57] ABSTRACT

A method of accessing an optical card comprises a first accessing step of making a beam spot projected from an optical head access a target track on the optical card, on those regions of the optical card which are on the outside of ID areas situated on the optical card at its both end portions along an axis of movement of the optical card, a detecting step of detecting whether a tracking error of the beam spot has occurred, following the completion of the first accessing step, and a second accessing step of making, where the tracking error of the beam spot has been detected, the beam spot access the target track on the region on the side opposite to the side where the tracking error has occurred.

9 Claims, 6 Drawing Sheets

METHOD OF ACCESSING A CARD SHAPED RECORDING MEDIUM

This application is a continuation of application Ser. No. 07/663,412, filed Mar. 1, 1991.

BACKGROUND OF THE INVENTION

1. Field of the Invention

The present invention relates to a method of enabling a light beam emitted from, for example, an optical head to access a track on a card-shaped recording medium.

2. Description of the Related Art

An optical card or a card-shaped recording medium has a memory capacity which is about a few thousands through ten thousand times larger than the memory capacity of a magnetic card. Since the optical card has a memory capacity of 1 to 2 megabytes, it is applicable to various uses: deposit passbooks, portable maps, prepaid cards, etc.

Figure 1:
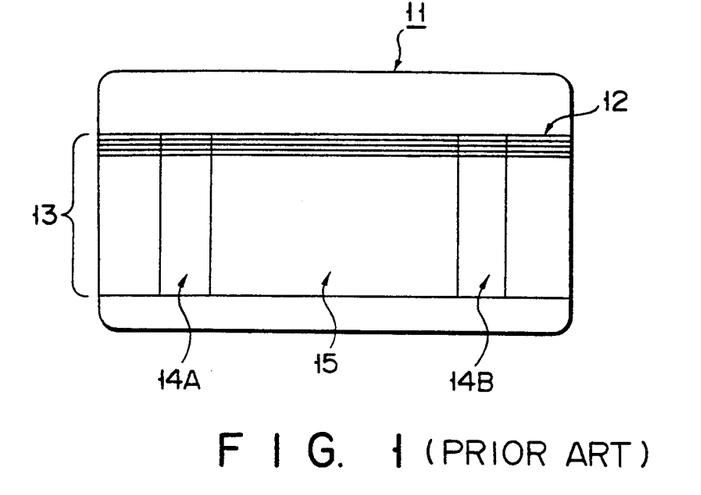
FIG. 1 is a plan view showing a conventional optical card.

Various types of optical cards have been proposed. The applicant of the present application proposed, in Published Unexamined Japanese Patent Application No. 63-37876, an optical card as shown in FIG. 1. An optical card 11, shown in FIG. 1, includes an optical recording section 13 having a plurality of parallel tracks 12. ID areas 14A and 14B are provided at both end portions of the optical recording section 13. The ID areas 14A and 14B store address data corresponding to the respective tracks 12, thus enabling data to be read in either direction. A data area 15 is provided between the ID areas 14A and 14B. The track address data corresponding to the tracks of the optical card 11 is recognized by reading the ID area 14B when the card 11 is moved relative to an optical head from the left (in FIG. 1) to the right along the tracks 12 or by reading the ID area 14A when the card 11 is moved from the right to the left reactive to the optical head.

Figure 2:
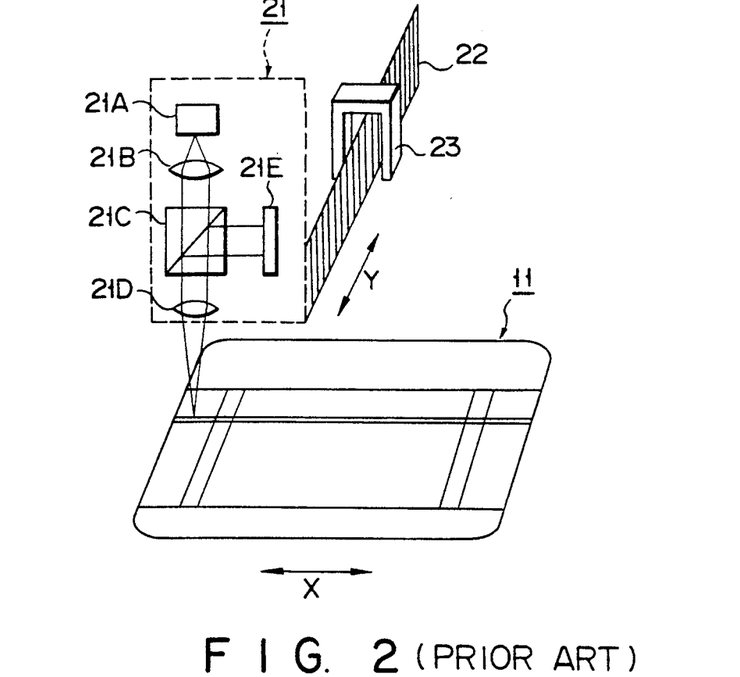
FIG. 2 schematically shows a structure of an optical card apparatus for recording/reproducing data, with use of the optical card shown in FIG. 1.

FIG. 2 shows the structure of a main part of an optical card apparatus using the optical card 11. The card 11 is moved in X-direction and an optical head 21 is moved in Y-direction perpendicular to X-direction, thereby recording/reproducing data. The optical head 21 includes a laser diode 21A. A light beam emitted from the laser diode 21A is projected onto the track on the optical card 11 through a collimator lens 21B, a prism 21C and an objective lens 21D. The beam is reflected from the track of the card 11 and received by a light detector 21E through the objective lens 21D and prism 21C. An output from the light detector 21E is fed to a signal processing circuit (not shown). The signal processing circuit detects a read-out signal, a focus error signal and a tracking error signal. The objective lens 21D is driven in the focusing direction and tracking direction (Y-direction) on the basis of the focus error signal and the tracking error signal. Namely the beam is controlled so as to be kept in the focused state in relation to the track on the card 11. The optical head 21 is provided with a linear scale 22 extending in Y-direction. The position of the optical head 21 in Y-direction is detected by the scale 22 and the scale detector 23.

In the optical card apparatus, the light beam to be projected onto the optical card 11 is shifted between different tracks in the method: 1) the entire body of the head 21 is moved in Y-direction and the head 21 is positioned by the linear scale 22 and scale detector 23 ("head seek" or "rough seek"), or 2) the objective lens 21D is shifted in a track-by-track manner ("track jump" or "fine seek").

The first method is used for quick shift between tracks which are situated at a relatively long distance. According to the first method, there is a low possibility that the light beam can be precisely positioned at a target track after the shift. The reason is that the precision of the linear scale 22 is not satisfactory and the position of the center of the objective lens may be displaced.

The second method is used for precise shift between tracks which are situated at a relatively short distance. According to the second method, the beam is surely jumped track by track, and therefore the beam can be positioned at a target track with high possibility, compared to the first method. However, the second "track-by-track" method requires a longer time for the shift between the tracks situated at a long distance, than the first method.

Figure 3:
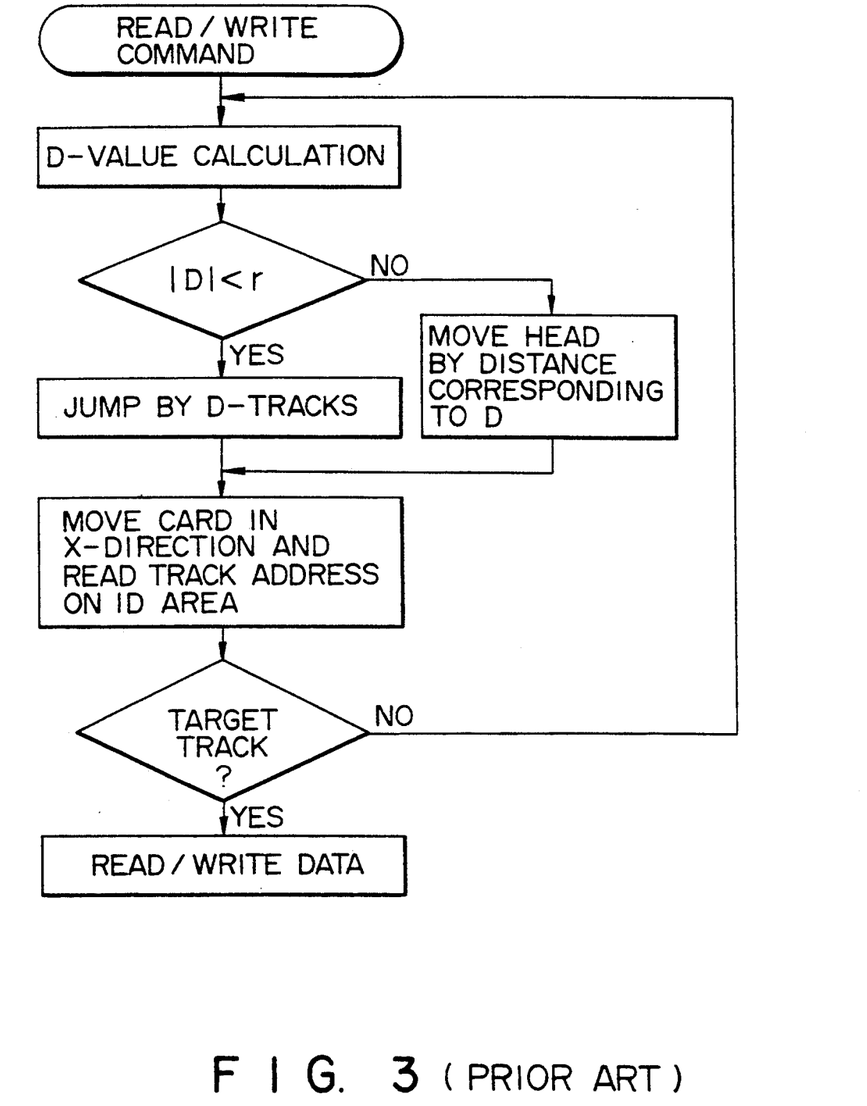
FIG. 3 is a flowchart illustrating an accessing method employed in a conventional optical card apparatus.

In the actual accessing process, the first and second methods, in general, are combined, as illustrated in FIG. 3. In starting data read/write, a difference D between the track address of the target track and the track address of the present track (at which the head is presently situated) is found. It is determined if the absolute value of D is less than a predetermined value r (normally 4 to 10). If the absolute value D is less than r, track jump (fine seek) is carried out for a distance corresponding to D. If the absolute value D is r or more, head seek (rough seek) is carried out for a distance corresponding to D, and the head is moved to the vicinity of the target track. Thereafter, the optical card 11 is moved in X-direction and the track address on the ID area 14A or 14B is read. If the track address which has been read coincides with the target track, the data read/write is executed. If they differ, the above operation is repeated. Normally, the target track can be accessed by the track jump access, unless the card has some defects.

The above accessing method is generally employed in the field of optical discs, etc.

In the above conventional accessing method, however, a seek error may occur and the target track cannot be accessed, if a region near the target track has some defect.

In the case of an optical card, unlike an optical disc, a recording/reproducing beam is moved relatively along the tracks in a linear and reciprocal manner. Thus, the speed of movement of the optical card, relative to the recording/reproducing beam, is not constant. In general, the speed of movement of the inner area of the card (including ID areas) is substantially constant, and that of the outer areas (outside the ID areas) is decreased because of temporary stop and start of movement of the card. On the other hand, if there is a defect on the optical card, a tracking servo is disturbed and a tracking error may occur. The possibility of tracking error becomes higher, as the speed of movement of the card decreases, because the time period at which the head is passing over the defective point increases. In the case where the speed of movement of the card is low, even a small defect on the card may lead to tracking error. In fact, tracking errors due to defects on the card are caused, in many cases, by the defects on the areas outside the ID areas.

Figure 4:
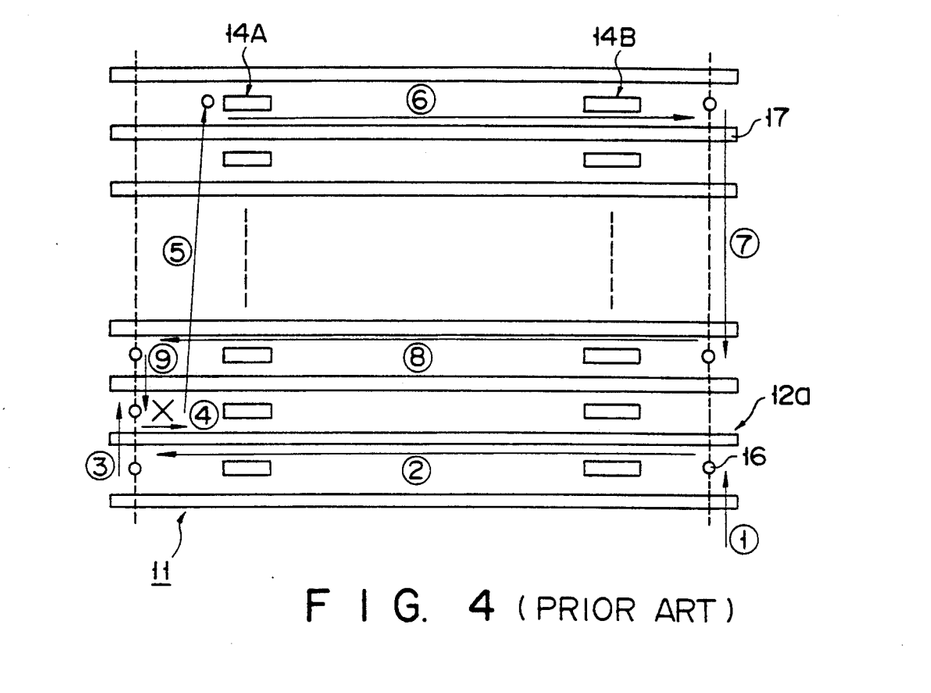
FIG. 4 shows a locus of movement of a beam spot, obtained in the accessing method of FIG. 3.

The occurrence of the seek error in a conventional access method will now be described with reference to FIG. 4. In FIG. 4, reference numeral 16 denotes a beam spot, 17 a guide track, and 12a a target track.

In the initial state, the beam spot 16 is situated at a location relatively far away from the target track 2a. The beam spot 16 is brought to the vicinity of the target track 12a by the head seek, as indicated by arrow ①. Then, with the movement of the optical card 11 in a first direction along the tracks, the spot 16 is moved, as indicated by arrow ②, and the ID area 14B is read. In this case, since the spot 16 is close to the target track 12a, it is shifted to the track 12a by track jump, as indicated by arrow ③. Thus, the beam spot 16 is positioned at the target track 12a. Then, with the movement of the card 11 in a second direction along the tracks, the spot 16 is moved, as indicated by arrow ④. If there is no defects on the card, the track address is confirmed by reading the ID area 14A, and subsequently, data read/write is carried out on the target track 12a.

If a defect (indicated by x) is present on the optical card 11, the tracking error occurs and the beam spot 16 is displaced to a non-target track, as shown by arrow ⑤. Consequently, the beam spot 16 scans the non-target track, as indicated by arrow ⑥. In this case, the beam spot 16 reads the ID area 14A to confirm the track address. If the amount of the tracking error indicated by arrow ⑤ is large, the difference D between the target track 12a and non-target track increases; thus, the head seek is carried out once again. Namely, the beam spot 16 is moved to the target track or a track near the target track, as indicated by arrow ⑦. Then, the beam spot 16 scans this track to which the spot 16 has been moved as indicated by arrow ⑧, with the movement of the optical card 11 in the first direction. and also reads the ID area 14B to confirm the track address. In this case, the track which has been read is not the target track 12a, subsequently track jump is performed, as indicated by arrow ⑨, whereby the beam spot 16 is brought to the target track 12a.

The above operation is repeated until the beam spot 16 is positioned at the target track 12a. More specifically, this operation is repeated until the amount of tracking error indicated by arrow ⑤ is so small that the beam spot 16 can be shifted to the target track 12a by "track jump" over the distance indicated by arrow ⑦, or until the spot 16 is incidentally shifted to the target track 12a by single "head seek" over the distance indicated by arrow ⑦. In this way, the accessing process is repeated several times until the beam spot 16 is positioned to the target track 12a; however, during the accessing process, a further tracking error may occur owing to a defect (indicated by x) on the optical card 11 so that the access to the target track cannot be attained.

SUMMARY OF THE INVENTION

The present invention has been made in consideration of the above circumstances, and its object is to provide a method of accessing a card-shaped recording medium capable of reducing the possibility of a seek error and making a beam spot surely access a target track.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 5:
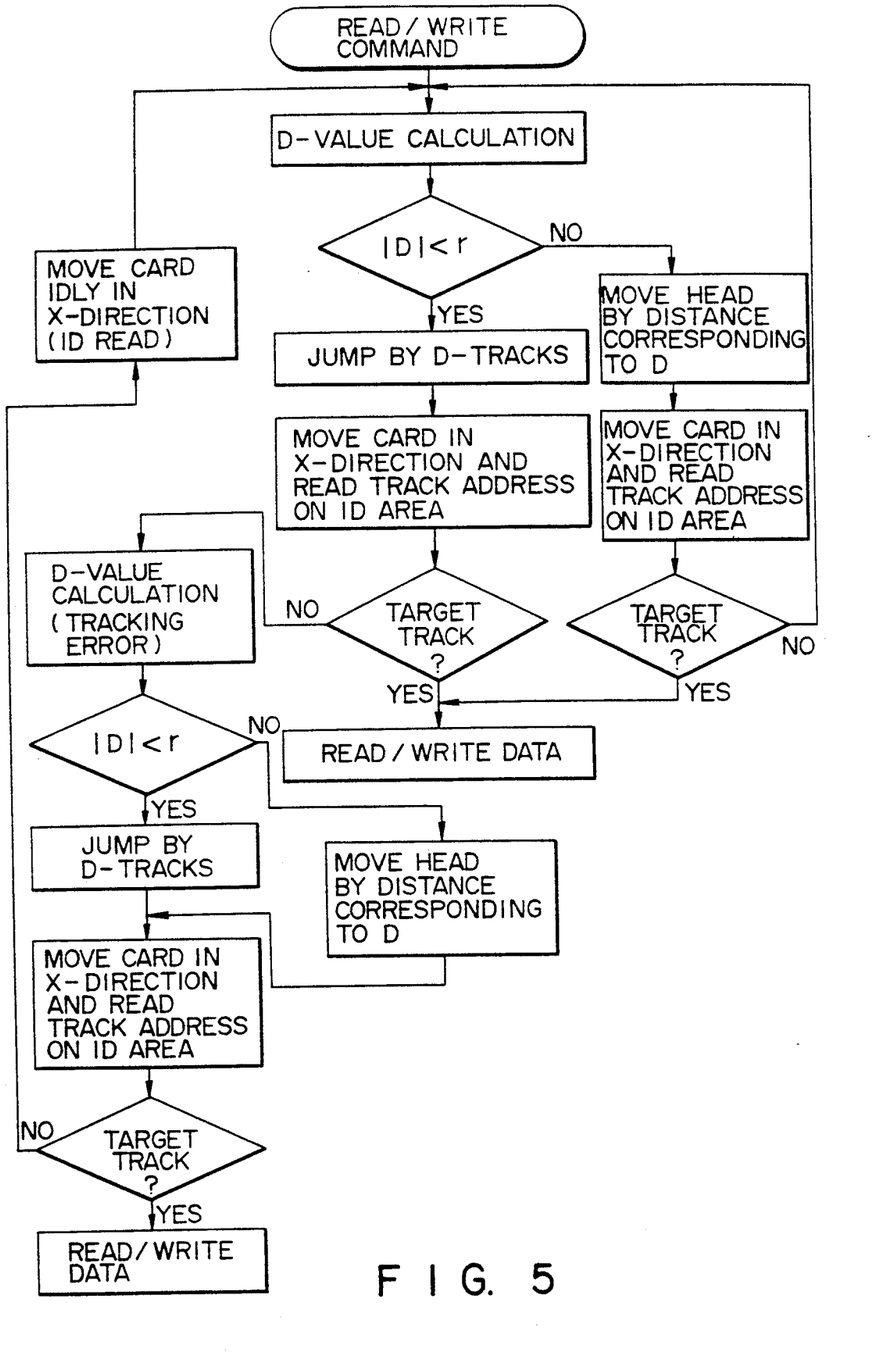
FIG. 5 is a flowchart showing a first embodiment of the accessing method of the present invention.
Figure 6:
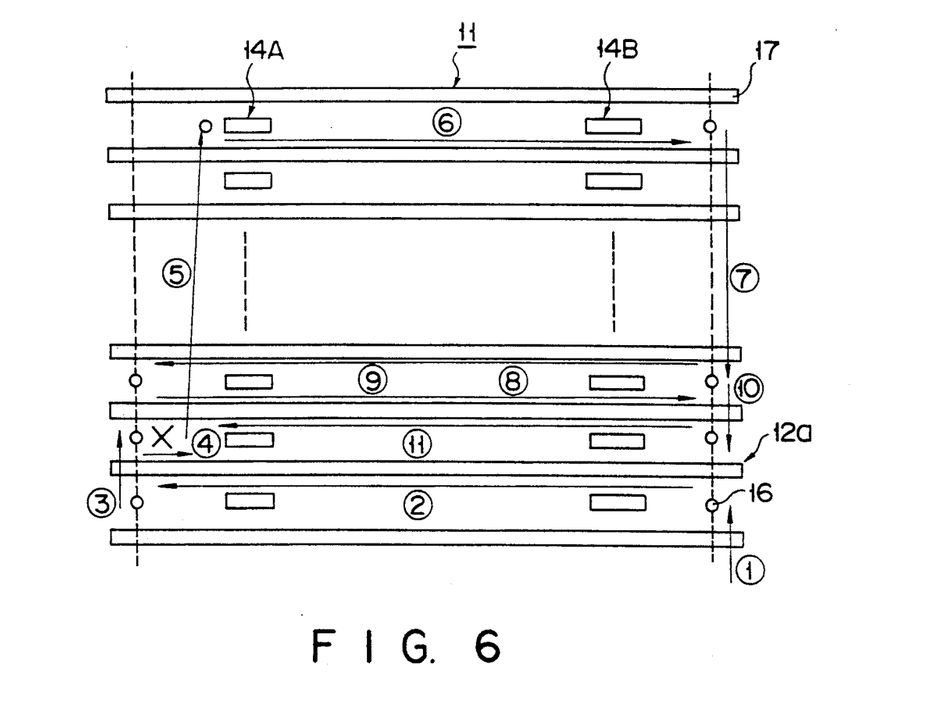
FIG. 6 shows an example of a locus of movement of a beam spot according the first embodiment.

FIG. 5 is a flowchart showing a first embodiment of the accessing method of the present invention, and FIG. 6 shows an example of a locus of movement of a beam spot according the first embodiment. In the first embodiment, the conventional optical card 11 shown in FIG. 1 is employed. Like the prior art, the light beam emitted from the optical head is caused to access a target track by reciprocally moving the optical card 11 in the direction of tracks (X-direction and moving the optical head in a direction (Y-direction) crossing the tracks. In the following description, the structure of the optical card apparatus is the same as that of the conventional one shown in FIG. 2; therefore, a description thereof is omitted.

In the first embodiment, the address of a track selected after track jump is confirmed and the presence/absence of a tracking error is detected. If the error is detected, the optical card 11 is moved idly, and then a target track is accessed from the side opposite to the side on which the tracking error was detected. A difference D between a track address of a target track and a track address of a present track (at which the head is presently situated) is found. Then, the absolute value of D is compared with a predetermined value r. Based on the comparison result, the head seek and track jump are carried out, in a similar manner with the prior art shown in FIG. 3.

The first embodiment will now be described in greater detail with reference to FIGS. 5 and 6.

In the initial state, the beam spot 16 is situated at a location relatively far away from the target track 12a. The beam spot 16 is brought to the vicinity of the target track 12a by head seek, as indicated by arrow ①. Then, with the movement of the optical card 11 in the first direction along the tracks, the spot 16 is moved, as indicated by arrow ②, and the ID area 14B is read to confirm the track address. In this case, since the spot 16 is close to the target track 12a, it is shifted to the track 12a by track jump, as indicated by arrow ③. Thus, the beam spot 16 is positioned at the target track 12a. Then, with the movement of the card 11 in the second direction along the tracks, the spot 16 is moved, as indicated by arrow ④. If there is no defect on the card, the track address is confirmed by reading the ID area 14A, and subsequently, data read/write is carried out on the target track 12a.

If a defect (indicated by x) is present on the optical card 11, the beam spot 16 is displaced to a non-target track, as shown by arrow ⑤. Consequently, the beam spot 16 scans an endmost track, as indicated by arrow ⑥. In this case, the beam spot 16 reads the ID area 14A to recognize that the endmost track differs from the target track 12a. Thus, a tracking error is detected. If the amount of the tracking error, indicated by arrow ⑤ is large, the difference D between the target track 12a and endmost track increases; thus, the head seek is carried out once again. Specifically, the beam spot 16 is moved to the target track or a track near the target track, as indicated by arrow ⑦. Then, the beam spot 16 scans this track, as indicated by arrow ⑧, with the movement of the optical card 11 in the first direction, and also reads the ID area 14B to confirm the track address. In this case, if it is detected that the beam spot has not yet been positioned at the target track, the optical card 11 is moved idly so that the beam spot 16 is moved in the second direction along the same track, as indicated by arrow ⑨. A track jump operation is performed once again, as shown by arrow ⑩, thereby positioning the beam spot 16 at the target track 12a. Thereafter, the optical card 11 is moved in the first direction and the beam spot 16 is moved in the direction of arrow ⑪. While the beam spot moves, the ID area 14B is read to confirm the track address. Thus, the data read/write on the target track 12a is carried out.

The relationship between the flowchart shown in FIG. 5 and the diagram shown in FIG. 6 will now be explained.

As an example, a read/write command is issued (SI), the beam spot 16 moves in the manner indicated by arrow ① in FIG. 6. Subsequently, the optical card 11 is conveyed to the right, whereby the beam spot 16 scans a track, as indicated by arrow ② in FIG. 6. At the time, data is read from ID area 14B, and the number D of tracks located between the present position of the beam spot 16 and the target track is calculated (S2). If it is determined in step S3 that the value of D is smaller than a predetermined value r (e.g., a value in the range of 4 to 10), the beam spot 16 is moved further, as indicated by arrow ③. Subsequently, the optical card 11 is conveyed to the right, whereby the beam spot 16 scans a track, as indicated by arrow ② in FIG. 3 in FIG. 6. At the time, the beam spot is moved track by track (fine seek) by the distance corresponding to the number D (S4). After this fine seek, the optical card 11 is conveyed to the left, and data is read from ID area 14A. If it is determined on the basis of the read data that the beam spot 16 is located on the target track, a data read/write operation is performed with respect to the track (S14).

If it is determined in step S3 that the value of D is equal to, or larger than the predetermined value r, the beam spot 16 is moved, as indicated by arrow ③ in FIG. 6. At the time, the beam spot 16 is moved in units of a predetermined number of tracks (coarse seek) by the distance corresponding to the number D (S3b). After that coarse seek, the optical card 11 is conveyed to the left, and data is read from ID area 14A (S3c). On the basis of the read data, it is determined whether the beam spot is located on the target track (S3d). If it is determined that the beam spot 16 is located on the target track, a data read/write operation is performed with respect to the track (S14). On the other hand, if it is determined that the beam spot is not located on the target track, the processing flow returns to step S2, and similar processing to that mentioned above is repeated.

If the optical card 11 has a defect, the beam spot 16 jumps to another track, as is indicated by arrow ⑤ in FIG. 6, and does not scan the target track, as is indicated by arrow ⑥. In this case, data is read from ID area 14A, so as to confirm that the beam spot is scanning a track different from the target track (S6). In addition, the number D of tracks existing between the scanned track and the target track is detected (S7). If it is determined that the value of D is smaller than a predetermined value (S8), a track jump is performed (S9). On the other hand, if it is determined that the value of D is greater than the predetermined value, coarse seek is performed (S8b). After the track jump or coarse seek, the optical card 11 is conveyed to the right, and the beam spot 16 scans a track, as indicated by arrow ⑨ in FIG. 6. At the time, data is read from ID area 14B, and it is determined whether or not the track which is being scanned is the target track (SII). If the track which is being scanned is the target track, a data read/write operation is performed with respect to the track.

If it is determined in step S11 that the track which is being scanned is not the target track, the optical card 11 is moved to the left in an idle manner (S13). As a result, the beam spot 16 moves to a region which is opposite to that in which the defect exists, as indicated by arrow ⑨ in FIG. 6. At the time, data is read from ID area 14A, and the value of D is detected once again (S2). Thereafter, the beam spot 16 is moved to the target track to access it, by following the procedures of the flowchart mentioned above.

As has been described above, according to the present invention, where the tracking error of beam spot 16 due to the defect on the optical card is detected, the target track 12a is accessed from the side opposite to the side on which the tracking error was detected. Thus, the beam spot can access the target track 12a, without a seek error.

Figure 7:
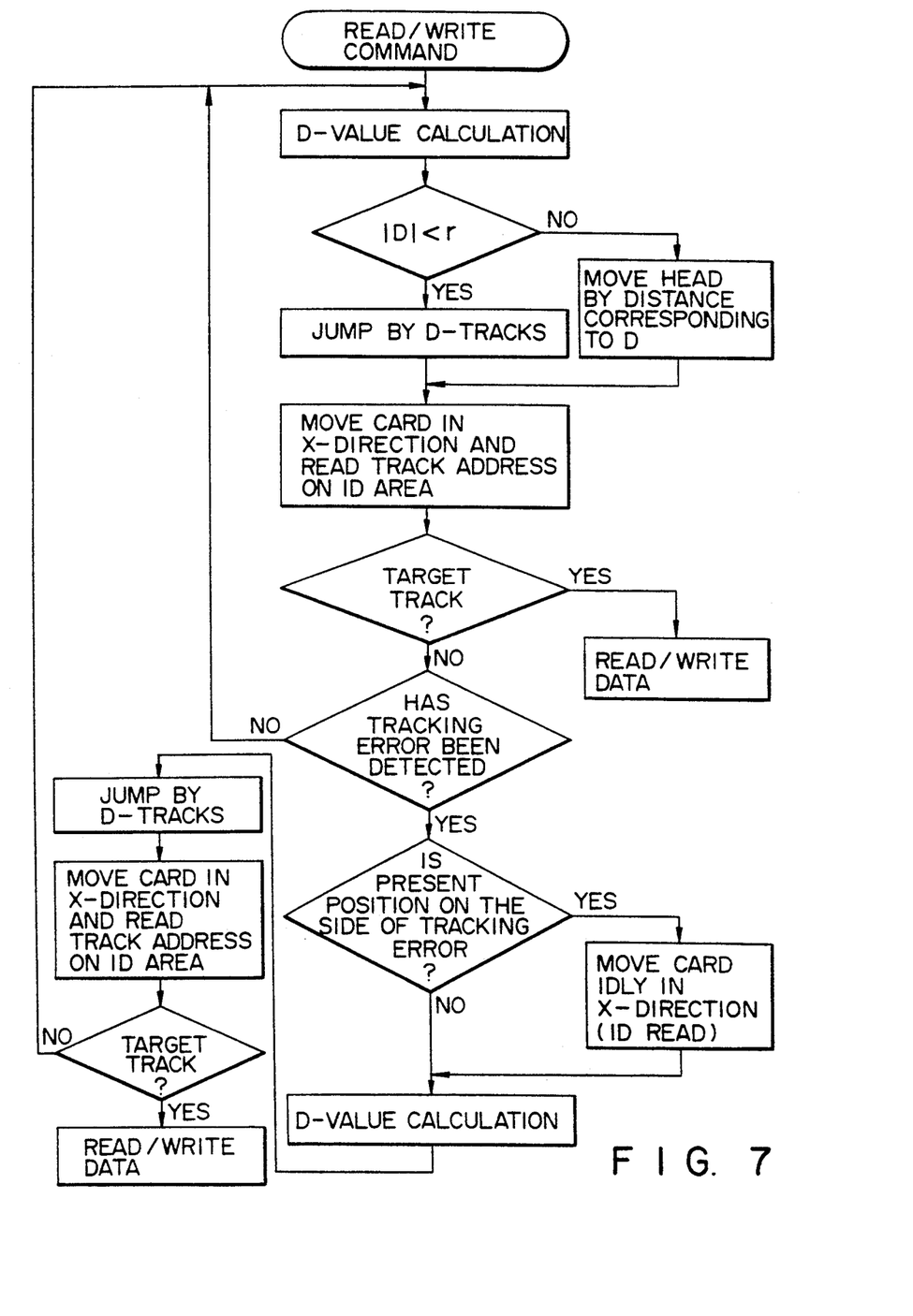
FIG. 7 is a flowchart showing a second embodiment of the accessing method of the present invention.
Figure 8:
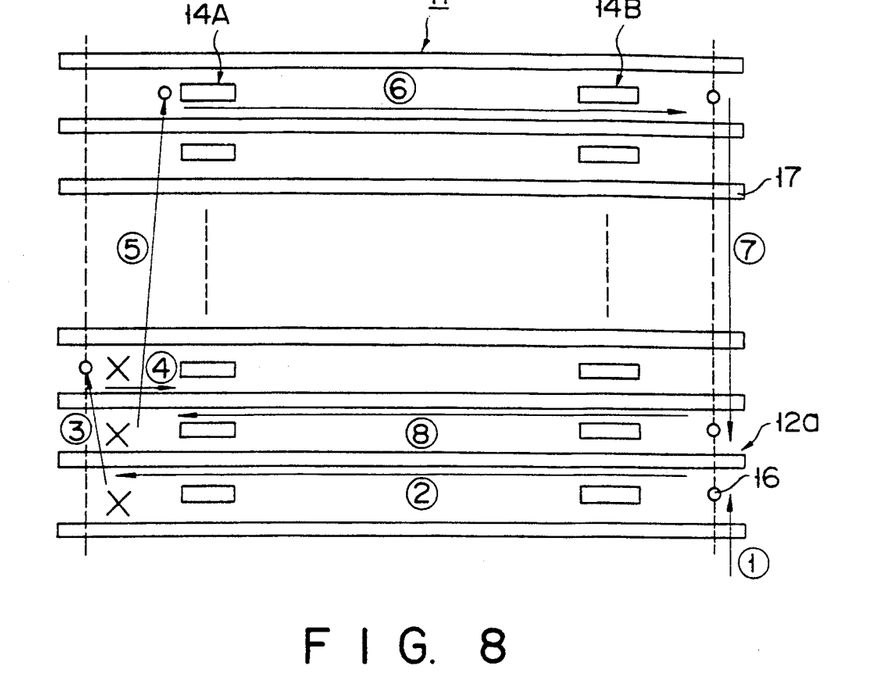
FIG. 8 shows an example of a locus of movement of a beam spot according to the second embodiment.

FIG. 7 is a flowchart showing a second embodiment of the accessing method of the present invention, and FIG. 8 shows an example of a locus of movement of a beam spot according to the second embodiment. According to the second embodiment, the tracking error is detected directly on the basis of a tracking error signal, as is disclosed, for example, in Published Unexamined Japanese Patent Application No. 58-189840. When the tracking error is detected, the target track is accessed, entirely by means of track jump, on the side opposite to the side on which the tracking error was detected.

The second embodiment of the invention will now be described in greater detail with reference to FIGS. 7 and 8. In the initial state, the beam spot 16 is situated at a location relatively far away from the target track 12a. The beam spot 16 is brought to the vicinity of the target track 12a by head seek, as indicated by arrow ⑦. Then, with the movement of the optical card 11 in the first direction along the tracks, the spot 16 is moved, as indicated by arrow ②, and the ID area 14B is read to confirm the track address. In the case where the beam spot 16 deviates to another track (as indicated by arrow ③) owing to a defect (indicated by x) near the end of this track, the tracking error is detected on the basis of the tracking error signal generated at this time. Then, on the basis of, for example, a movement direction signal for moving the optical card 11, it is determined on which side of the card the beam spot 16 is located. If the beam spot 16 is located on the side where the tracking error occurred, the beam spot 16 is moved, as indicated by arrow e,crc/4/, with the idle movement of the optical card 11 in the second direction along the tracks. In this case, the ID area 14A is read to confirm the track address. In FIG. 8, during the idle movement of the optical card 11, a further tracking error occurred, as shown by arrow (5), and the beam spot 16 is moved, as indicated by arrow (6).

In the first embodiment, where the difference D between the track address read during the idle movement of card 11 and the track address of the target address is large, the beam spot 16 is moved by means of head seek. In the second embodiment, where the tracking error is detected, the beam spot 16 is moved to the target track 12a by track jump, as shown by arrow e,crc/7/, on the subsequent opposite-side access. Thereafter, the optical card 11 is moved in the first direction and the beam spot 16 is moved in the direction of arrow (8). Thus, the ID area 14B is read to confirm the track address, and the data read/write on the target track 12a is carried out.

As has been described above, in the second embodiment, where the tracking error occurred, the target track is accessed by track jump on the side opposite to the side on which the error occurred. Thus, even if tracking errors occur in a plurality of tracks including a target track, the target track can always surely be accessed.

The relationship between the flowchart in FIG. 7 and the diagram in FIG. 8 will now be explained.

Since steps SI–S3 are similar to those of the embodiment described above, a description of them will be omitted.

If it is determined in step S3 that the value of D is smaller than the predetermined value r, a track jump is performed (S4). On the other hand, it is determined that the value of D is equal to, or greater than, the predetermined value r, coarse seek is performed (S3b). When the optical card 11 is conveyed to the left after the track jump or the coarse seek, data is read from ID area 14A (S5), and it is determined whether or not the track which is being scanned is the target track. If it is determined that the track which is being scanned is the target track, a data read/write operation is performed with respect to the track (S6b).

If it is determined in step S6 that the track which is being scanned is not the target track, it is determined whether or not a tracking error has occurred (S7). If no tracking error is detected, the flow returns to step S2, from which the operations mentioned above are repeated. If a tracking error is detected, the present position of the beam spot 16 is detected (S8).

If the beam spot 16 is detected as being located in a region where the tracking error occurs, the optical head 11 is moved in an idle manner (s8b). In the case depicted in the drawing, the beam spot 16 is located in a region where the tracking error occurs. Thus, the optical card 11 is moved in an idle manner, and the beam spot 16 moves to a region located opposite to that where the defect exists. At the time, data is read from ID area 14A, so as to detect the value of D (S9).

Thereafter, track jumping is performed (S10), so that the beam spot moves toward the target track, as indicated by arrow (7) in FIG. 8. Subsequently, the optical card 11 is conveyed to the right, and the beam spot 16 scans a track, as indicated by arrow (8) in FIG. 8. At the time, data is read from ID area 14B (SII), so as to determine whether or not the track which is being scanned is the target track (S12). If it is determined that the track which is being scanned is the target track, a data read/write operation is performed with respect to the track (S12). If it is determined that the track which is being scanned is not the target track, then the flow returns to step S2.

Figure 9:
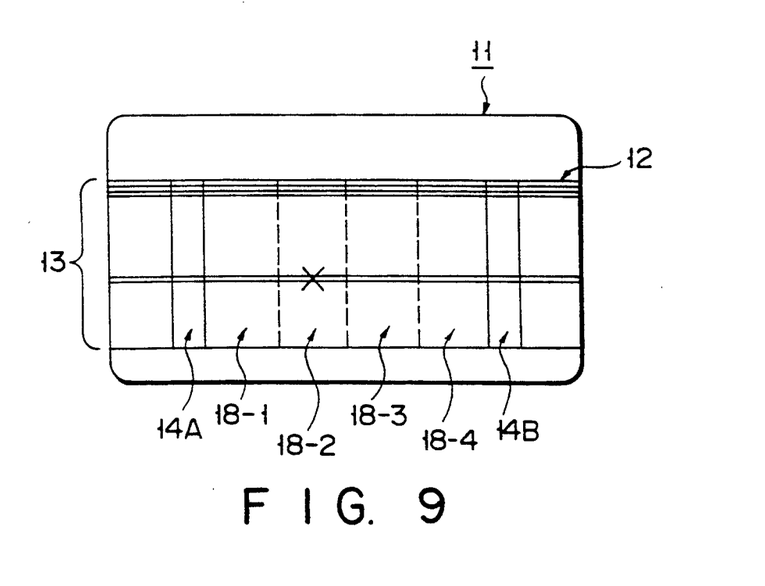
FIG. 9 shows an example of an optical card to which the method of this invention is applicable.

The present invention is not limited to the above embodiments, and various changes and modifications may be made within the spirit of the present invention. For example, in the above embodiments, the data area 15 of card 11 is not divided into sectors; however, the present invention is effectively applicable to an optical card having tracks 12 divided into sectors 18-1 to 18-4, as shown in FIG. 9. In this case, even if a tracking error occurs in sector 18-2 (indicated by x) of one track 12, the other sectors 18-1, 18-3 and 18-4 of this track can surely be accessed.

As has been described above, the present invention can provide a method of accessing a card-shaped recording medium, wherein a tracking error is detected and, where the error has occurred, a target track is accessed from the side opposite to the side on which the error has occurred, thereby reducing the possibility of a seek error and surely accessing a beam.

What is claimed is;

1. A method of accessing a target track on a card-shaped recording medium, said method comprising:
   an accessing step of moving a beam spot projected from an optical head toward the target track along one of two access regions of the recording medium which are on the outside of ID area situated on end portions along an axis of movement of the recording medium;
   a scanning step of scanning, with the beam spot, a track corresponding to that portion of the recording medium to which the beam spot is moved in said accessing step;
   a detecting step of detecting the occurrence of a tracking error of the beam spot;
   a tracking error avoidance accessing step of further moving the beam spot toward the target track if the occurrence of a tracking error is detected in said detecting step;
   a tracking error avoidance scanning step of scanning, with the beam spot, a track corresponding to that portion of the recording medium to which the beam spot is moved in said tracking error avoidance accessing step;
   a tracking error avoidance moving step of further moving the beam spot toward the one of said two access regions on the side of said recording medium opposite to the side on which the occurrence of a tracking error was detected, when the track scanned in said tracking error avoidance scanning step differs from the target track and the beam spot is positioned in the access region on the side of said recording medium on which the occurrence of a tracking error was detected; and
   a target track accessing step, responsive to one of said tracking error avoidance scanning step and said moving step, of further moving the beam spot to the target track when the beam spot is on the one of said two access regions on the side of said recording medium opposite to the side on which the occurrence of a tracking error was detected.

2. A method according to claim 1, wherein said target track accessing step includes a conveying step of conveying the recording medium if the beam spot is in the one of said two access regions on the side of the recording medium on which the occurrence of a tracking error was detected.

3. A method according to claim 2, wherein said target track accessing step includes a fine seek step of jumping the beam spot track by track until the beam spot reaches the target track.

4. A method according to claim 3, wherein said target track accessing step includes a coarse seek step of jumping the beam spot in units of a predetermined number of tracks until the beam spot reaches the target track.

5. A method according to claim 2, wherein said tracking error avoidance accessing step includes a fine seek step of jumping the beam spot track by track until the beam reaches the target track.

6. A method according to claim 6, wherein said tracking error avoidance accessing step includes a coarse seek step of jumping the beam spot in units of a predetermined number of tracks until the beam spot reaches the target track.

7. A method of accessing a target track on a card-shaped recording medium, said method comprising:

an accessing step of moving a beam spot projected from an optical head toward the target track along one of two access regions of the recording medium which are on the outside of ID areas situated on end portions along an axis of movement of the recording medium;

a scanning step of scanning, with the beam spot, a track corresponding to that portion of the recording medium to which the beam spot is moved in said accessing step;

a detecting step of detecting the occurrence of a tracking error of the beam spot;

a position-detecting step of detecting the position of the beam spot if the occurrence of a tracking error of the beam spot is detected in the detecting step;

a moving step of moving the beam spot to the one of said two access regions on the side of the recording medium opposite to the side where the occurrence of a tracking error was detected, if in the position-detecting step the beam spot is detected as being located in the other of said two access regions on the side where the occurrence of a tracking error was detected; and a target track accessing step, responsive to one of said position-detecting step and said moving step, of moving the beam spot to the target track along the one of said two access regions on the side of the recording medium opposite to the side where the occurrence of a tracking error was detected.

8. A method according to claim 7, wherein said moving step is carried out by conveying the recording medium.

9. A method according to claim 8, wherein said target track accessing step is carried out by jumping the beam spot track by track.

* * * * *